C. E. MORRIS.
POWER MECHANISM FOR MERRY-GO-ROUNDS.
APPLICATION FILED FEB. 21, 1917.
1,315,980.
Patented Sept. 16, 1919.
2 SHEETS—SHEET 1.
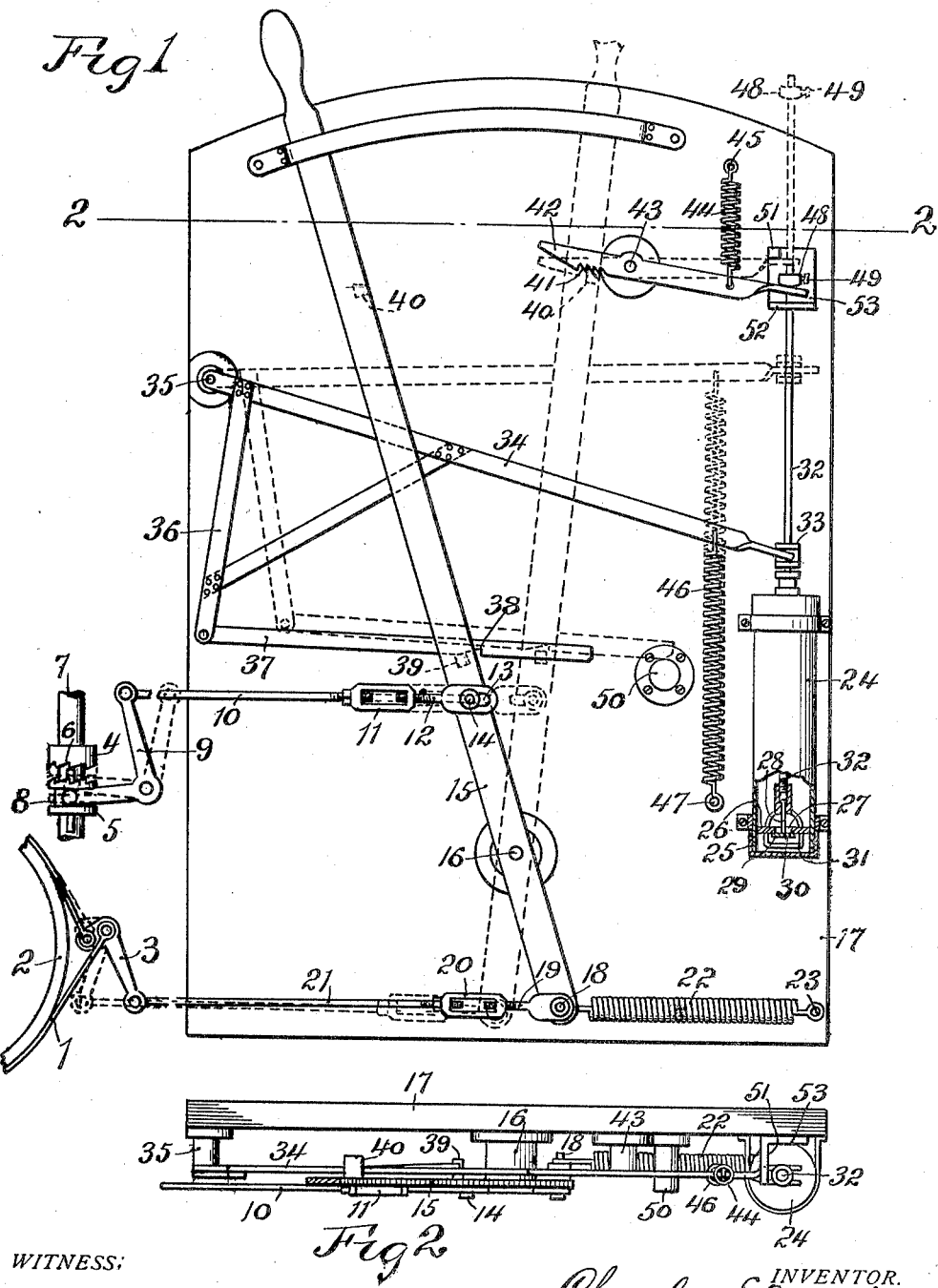

C. E. MORRIS.
POWER MECHANISM FOR MERRY-GO-ROUNDS.
APPLICATION FILED FEB. 21, 1917.
1,315,980.
Patented Sept. 16, 1919.
2 SHEETS—SHEET 2.
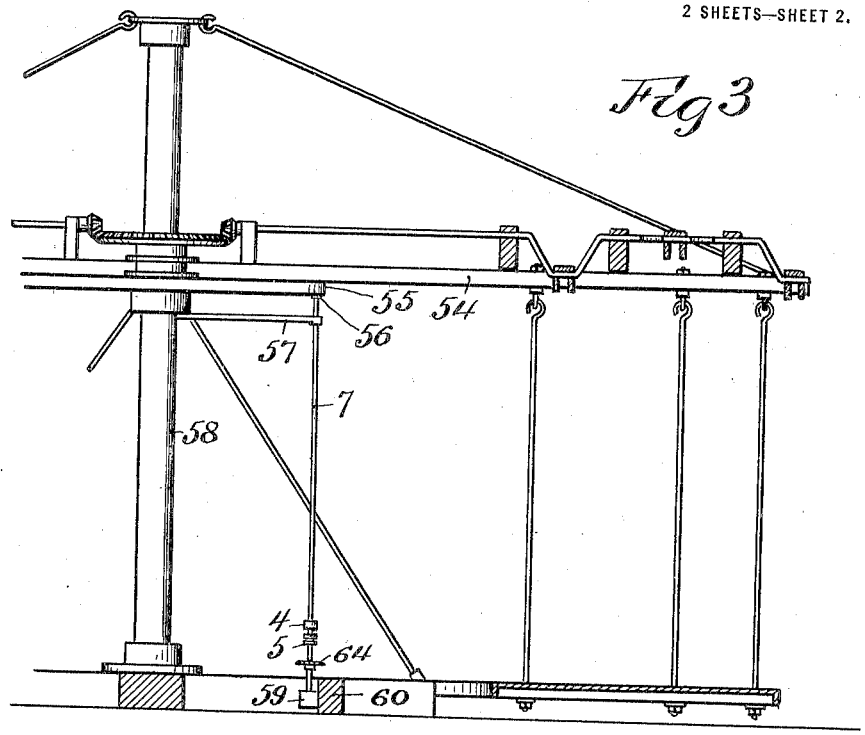
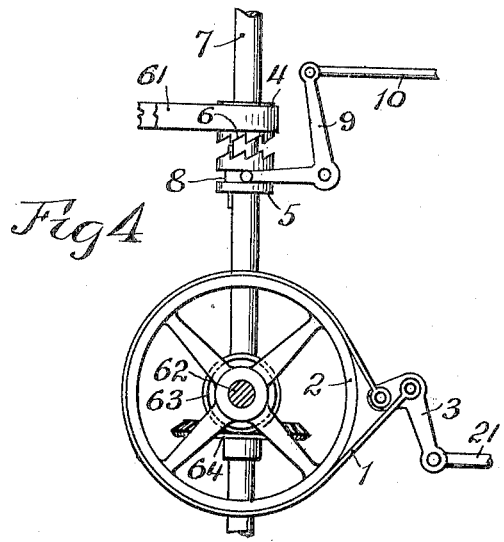
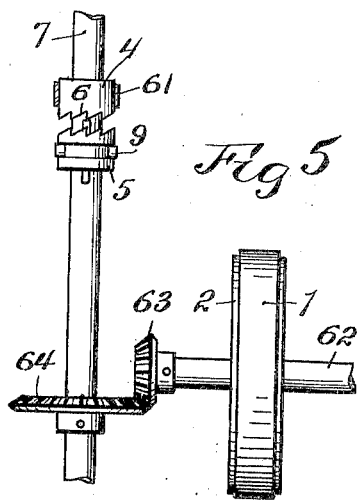
WITNESS:
R. E. Hamilton
INVENTOR.
Charles E. Morris
BY Warren D. House
His ATTORNEY

UNITED STATES PATENT OFFICE.

CHARLES E. MORRIS, OF LEAVENWORTH, KANSAS, ASSIGNOR TO CHARLES W. PARKER, OF LEAVENWORTH, KANSAS.

POWER MECHANISM FOR MERRY-GO-ROUNDS.

1,315,980. Specification of Letters Patent. Patented Sept. 16, 1919.

Application filed February 21, 1917. Serial No. 150,244.

*To all whom it may concern:*

Be it known that I, CHARLES E. MORRIS, a citizen of the United States, residing at Leavenworth, in the county of Leavenworth and State of Kansas, have invented a certain new and useful Improvement in Power Mechanisms for Merry-Go-Rounds, of which the following is a specification.

My invention relates to improvements in power mechanisms for merry-go-rounds.

The object of my invention is to provide novel, simple and efficient mechanism for automatically controlling and determining the period of activity or of inactivity of a power driven machine.

My invention provides further novel time controlled mechanism by means of which the driving mechanism of a machine and the brake mechanism thereof may be simultaneously operated.

A further object of my invention is to provide novel means by which the activity or inactivity of a machine may be adjustably controlled.

Still another object of my invention is to provide a mechanism which is reliable in operation, which is durable and not liable to get out of order, which may be economically manufactured and which may be readily applied to existing machines of various kinds.

My invention is particularly well adapted for use in connection with merry-go-rounds, carousels, round-abouts and other apparatus, in the operation of which it is desirable to manually start the machine into operation, and to have it automatically stop after it has been operating for a pre-determined period of time.

In the accompanying drawing, which illustrates the preferred embodiment of my invention, as adapted for employment in connection with a merry-go-round or round-about, Figure 1 is an elevation of my improved mechanism, the parts being shown in solid lines with the clutch members disconnected and with the brake set, this being the position of the parts when the machine which the apparatus controls is inactive. In this figure, the parts are represented in dotted lines in the positions occupied by them when the machine is active. In this view, some of the parts are broken away.

Fig. 2 is a cross section on the line 2—2 of Fig. 1, some of the parts being omitted.

Fig. 3 is a view, partly in vertical section and partly in elevation of a portion of a merry-go-round provided with my improvement, some of the parts being omitted.

Fig. 4 is an enlarged elevation of the clutch mechanism and the brake mechanism and parts connected therewith.

Fig. 5 is a view similar to Fig. 4, taken at right angles thereto.

Similar reference characters designate similar parts in the different views.

The brake mechanism illustrated is of a common type having a brake band 1 which encircles and is adapted to embrace and apply a braking pressure to the periphery of a brake wheel 2, which is secured to a rotating part of the machine, not shown, to which the mechanism is to be applied. As these two elements are of well-known construction, portions of the band 1 and wheel 2 are shown.

The ends of the brake band 1 are secured in the usual manner to an ordinary bell crank lever 3 in the way which is well understood by those familiar with this type of brake.

The clutch mechanism illustrated is of a conventional type comprising two clutch members 4 and 5 having the usual end teeth 6 adapted to interlock with each other, the clutch member 4 being freely rotative on a driving shaft 7, and the clutch member 5 being slidably mounted on said shaft and having the usual tongue and groove connection therewith for holding the clutch member 5 from rotation thereon. The shaft 7, in this connection, will be assumed to be the driven member of the machine which is to be controlled by the timing apparatus, and the clutch member 4 is assumed to be the driving member, which may be rotated by any suitable power means. It will be understood, of course, that this relationship may be reversed, the clutch member 4, in such case, being the driven member and the shaft 7 the driving member.

For sliding the clutch member 5 into and out of engagement with the clutch member 4, the clutch member 5 is provided with the usual peripheral groove 8, in which is disposed one arm of a bell crank lever 9, the other arm of which is connected to a horizontal rod 10, which is connected by a turn buckle 11 with a rod 12 having a longitudinal slot 13, in which is slidably mounted a pin 14 secured to and extending laterally from a hand lever 15 which, intermediate of its ends, is pivoted to a horizontal post 16, which is secured to a flat-faced vertical support, such as a board 17.

The pin 14 is secured to the lever 15 above the post 16. Secured to said lever 15 below the post 16 is a horizontal pin 18 to which is pivoted a rod 19, which is connected by a turn buckle 20, to one end of a horizontal rod 21, the other end of which is pivoted to one of the arms of the bell crank lever 3.

For normally automatically forcing the hand lever 15 to the inactive position shown in solid lines in Fig. 1, and for simultaneously forcing the brake band 1 to the braking position, and at the same time releasing the clutch member 5 from the clutch member 4, there is provided a coil pull spring 22, one end of which is secured to the pin 18, and the other end of which is secured to a pin 23 mounted in the support 17.

As a timing mechanism, I provide a dash pot mechanism consisting of the following described parts.

24 designates a hollow cylinder secured in the vertical position to the support 17 and having a closed upper end and an externally screw-threaded lower end, the latter having removably secured to it a screw cap 25.

Reciprocative in the cylinder 24 is a piston head 26 having a by-pass opening 27 therethrough, through which vertically extends the stem 28 of a valve 29, disposed below the cylinder head 26 and adapted, on the downward movement of the latter, to close the opening 27. The valve 29 is provided therethrough with a bleed passage 30, the size of which determines the speed of downward movement of the piston head 26. Secured to the lower side of the piston head 26 is a guard yoke 31 which limits the downward movement of the valve 29, relatively to the piston 26.

Secured to the piston 26 is a piston rod 32 which extends through and is slidable in the upper end of the cylinder 24.

The cylinder 24 may be filled with some suitable fluid, such as water, oil or air. When the piston rod 32 is lifted, it will draw upwardly the piston head 26, upon which the valve 29 will open, and the fluid in the cylinder 24, which is above the piston 26 will pass below the same through the opening 27. When the piston 26 is forced downwardly, the valve 29 will close, and the movement downwardly of the piston head will be controlled by the passage of the fluid through the bleed passage 30, through which the fluid will pass from the under to the upper side of the piston head 26.

For lifting the rod 32, the following described mechanism may be employed.

Secured rigidly to the rod 32 is a peripherally grooved collar 33 which is engaged by the free end of an arm 34 of a bell crank lever, which is pivoted adjacent to its angle to a post 35 secured to the support 17.

The other arm 36 of said bell crank lever has pivoted to it one end of a horizontal bar 37, which in its under edge is provided with a notch 38, which is adapted to receive and be operatively engaged by a horizontal pin 39 secured to the lever 15 above the fulcrum thereof.

When the manually operated hand lever 15 is moved by hand from the position shown in solid lines in Fig. 1, to the right, to the position shown in dotted lines in said figure, the clutch member 5 will be thrown into engagement with the clutch member 4, and the brake band 1 will be released from the wheel 2, by means of the mechanism already described, the spring 22 at the same time being extended, and the arm 34 and arm 36 will be forced to the positions shown in dotted lines in Fig. 1, the bar 37 having been engaged by the pin 39 and forced to the right, as viewed in Fig. 1.

When the lever 15 is swung to the position shown in dotted lines in Fig. 1, a lateral projection 40 on said lever will engage with teeth 41 provided in the under edge of a lever 42, which is pivoted to a horizontal post 43 secured to the support 17. A coil spring 44 is secured at one end to the lever 42, and at its upper end it is secured to a pin 45 mounted in the support 17. The spring 44 is disposed at the side of the post 43 opposite to the side at which are the teeth 41, whereby, the lever 42 will normally be swung downwardly to the position shown in dotted lines in Fig. 1, in which position it will cause the teeth 41 to engage with the lever projection 41, when the lever is swung to the position shown in dotted lines in Fig. 1.

A vertical coil spring 46 has its upper end secured to the arm 34, its lower end being secured to a pin 47 mounted in the support 17. This spring will normally cause the arms 34 and 36 to be swung to the position shown in solid lines in Fig. 1.

Secured slidably on the rod 32 is a collar 48 having a set screw 49 by which the collar may be secured to any position on the rod 32 to which it may be adjusted.

Secured to the support 17 is a horizontal post 50 which is adapted to be struck by and to lift the bar 37 to a position in which the latter will be disengaged from the pin 39, when the bar 37 is moved to the position shown in dotted lines in Fig. 1.

When the hand lever 15 is manually swung to the position shown in Fig. 1, in dotted lines, the brake mechanism is released and the clutch mechanism set in the engaged position, as above described, so that the machine which is being controlled may operate. At the same time the collar 33 will lift the rod 32, through the intermediacy of the arm 34, which is swung upwardly owing to the pin 39 of the lever 15 engaging the bar 37 and moving the bar to a position on top of the post 50, where the bar is disengaged from the bar 37.

Fluid will now pass upwardly through the bleed passage 30, and the spring 46 will draw downwardly the bar 34, thus retracting the bar 37 so that the notch 38 is to the left of the pin 39.

When the rod 32 has moved downwardly the required distance, the collar 48 will strike the right end of the lever 42, as viewed in Fig. 1, thereby releasing the pin 40 and permitting the spring 22 to retract the lever 15 to the inactive position shown in Fig. 1, in solid lines. Thereupon the brake mechanism will be set in the braking position, and the clutch mechanism will be set in the inactive or release position, shown in solid lines in Fig. 1, in the manner already described.

By vertically adjusting the collar 48 on the rod 32, the downward travel of the piston head 26 and rod 32 may be regulated to the distance desired, and the time consumed in such downward travel will depend upon the size of the bleed passage 30, the density of the fluid in the cylinder 24 and the strength of the spring 46. During this interval of time, the machine which is being controlled will be running. Whenever the hand lever 15 is swung to the position shown in dotted lines in Fig. 1, the brake mechanism will be released, the clutch mechanism will be operatively disposed, the piston head 26 and rod 32 will be raised and will then begin to lower, and the controlled machine will run until the collar 48 swings the lever 42 out of engagement with the lever pin 40, at which time the spring 22 will retract the lever 15 to its initial position, upon which the brake will be set, the clutch mechanism released, and the machine will stop running.

The elongated hole or slot 13 is provided so that when the lever 15 is retracting to the initial position, the pin 14 will strike the rod 12 with a sharp blow, so as to effect the ready release of the clutch members 4 and 5 one from the other.

As means for limiting the upward and downward movement of the right end of the lever 42, the latter is disposed between two projections 51 and 52 provided one above the other on a plate 53 which is secured to the support 17, the rod 32 being slidably mounted in a hole in the projection 52.

In Figs. 3, 4 and 5 the driving and brake mechanism are shown applied to a merry-go-round. 54 designates the ordinary revoluble frame of a merry-go-round having secured concentrically to it the usual internal gear 55 with which meshes a spur gear wheel 56, which is secured to the driving shaft 7 rotatably mounted in a bearing 57 secured to the center post 58 of the merry-go-round, and in a bearing 59 secured to the base 60 of the merry-go-round. A belt 61 is mounted on the clutch member 4 and is driven by any suitable power means, not shown. The brake wheel 2 is secured to a horizontal shaft 62 rotatably mounted in suitable bearings, not shown. Secured to the shaft 62 is a bevel gear wheel 63 which meshes with a bevel gear wheel 64 secured to the shaft 7.

When the lever 15 is swung to the right to the position shown in dotted lines in Fig. 1, it will lift the rod 32, as already described, and will be engaged and held by the lever 42. The brake strap 1 will now be released from clamping the wheel 2, and the clutch member 5 will be forced upwardly into engagement with the clutch member 4. The latter will now effect rotation of the shaft 7, thereby revolving the frame 54, through the intermediacy of the gear 55 and gear wheel 56.

The frame 54 will now be revolved until the spring 46 has retracted downwardly the rod 32 and the collar 48 has depressed the adjacent end of the lever 42 so as to release the lever 15. The spring 22 will now swing the lever 15 to the position shown in solid lines in Fig. 1, upon which the clutch member 5 will be disengaged from the clutch member 4, and the brake strap 1 will be applied to the wheel 2. Rotation of the shaft 7 will thus be stopped, thereby effecting the stopping of the revolving movement of the frame 54.

The running period of the frame 54 thus corresponds to the time required for the piston head 26 to move from its uppermost position to such position as it is permitted to move downwardly by the collar 48. As before described this collar may be adjusted on the rod 32 to different positions, thereby permitting the running time of the frame 54 to be regulated to suit the wishes of the operator. All that the operator is required to do is to swing the lever 15 to the operating position, after which the frame 54 will be automatically revolved and then stopped after the proper period of running time has elapsed.

I do not limit my invention to the structure shown and described, as modifications of my invention, within the scope of the appended claims, may be made without departing from the spirit of my invention.

What I claim is:—

1. In a merry-go-round having a driving member, the combination with said driving member, of an oscillatable member movable manually in one direction, means for automatically retracting said oscillatable member, means actuated by said oscillatable member for controlling said driving member, means for holding the oscillatable member in a pre-determined set position, time controlled means for releasing the oscillatable member from said holding means, and means actuated by said oscillatable member for setting the time controlled means into the operative position.

2. In a merry-go-round having a brake, the combination with said brake, of an oscillatable member movable in one direction manually, means for automatically retracting the oscillatable member, means actuated by the oscillatable member for operating the brake, means for holding the oscillatable member in a predetermined set position, time controlled means for releasing the oscillatable member from said holding means, and means actuated by the oscillatable member for setting the time controlled means into the operative position.

3. In a merry-go-round having driving mechanism and a brake mechanism, the combination with said driving and brake mechanisms, of operating means for simultaneously rendering one of said mechanisms inactive and the other active, the operating means being manually movable to a predetermined set position, means for automatically retracting the operating means to an initial position, means for holding the operating means in said set position, time controlled means for releasing the operating means from said holding means, and means actuated by the operating means in being moved to the set position for setting the time controlled means into the operative position.

In testimony whereof I have signed my name to this specification.

CHARLES E. MORRIS.

Copies of this patent may be obtained for five cents each, by addressing the "Commissioner of Patents, Washington, D. C."